United States Patent
Kakura et al.

(10) Patent No.: US 7,826,514 B2
(45) Date of Patent: Nov. 2, 2010

(54) RADIO TRANSMITTER-RECEIVING APPARATUS AND RADIO TRANSMITTING-RECEIVING METHOD FOR ESTIMATING NOISE AND INTERFERENCE POWER IN RADIO TRANSMISSION USING CODE SPREAD

(75) Inventors: Yoshikazu Kakura, Minato-ku (JP);
Shousei Yoshida, Minato-ku (JP);
Hiroyuki Atarashi, Yokohama (JP);
Noriyuki Maeda, Yokohama (JP)

(73) Assignees: NEC Corporation, Tokyo (JP); NTT DoCoMo, Inc., Tokyo (JP)

( * ) Notice: Subject to any disclaimer, the term of this patent is extended or adjusted under 35 U.S.C. 154(b) by 917 days.

(21) Appl. No.: 10/526,225

(22) PCT Filed: Apr. 26, 2004

(86) PCT No.: PCT/JP2004/005996

§ 371 (c)(1),
(2), (4) Date: Feb. 8, 2006

(87) PCT Pub. No.: WO2004/095749

PCT Pub. Date: Nov. 4, 2004

(65) Prior Publication Data
US 2006/0182167 A1    Aug. 17, 2006

(30) Foreign Application Priority Data
Apr. 24, 2003   (JP)   ................ 2003-119778

(51) Int. Cl.
*H04B 1/00* (2006.01)

(52) U.S. Cl. ..................................... 375/140

(58) Field of Classification Search .............. 375/130, 375/140, 260
See application file for complete search history.

(56) References Cited

U.S. PATENT DOCUMENTS

2004/0028007 A1* 2/2004 Sumasu et al. ............. 370/320

(Continued)

FOREIGN PATENT DOCUMENTS

JP    2000-091986 A    3/2000

(Continued)

OTHER PUBLICATIONS

Xiao et al ("A Novel MC-2D-CDMA Communication Systems and Its Detection Methods" 2000 IEEE International Conference on Communications, Publication Date: 2000 vol. 3, on pp. 1223-1227).*

(Continued)

*Primary Examiner*—David C Payne
*Assistant Examiner*—Leon-Viet Q Nguyen
(74) *Attorney, Agent, or Firm*—Sughrue Mion, PLLC

(57) ABSTRACT

A radio transmitter-receiver wherein a pilot symbol is used in the transmitter that has undergone M-chip spreading on the frequency axis and N-chip spreading on the time axis by a spreading code of M×N chip length (where M and N are any integers equal to or greater than 2), and in the receiver, a spreading code that is not used in spreading said pilot signal is used as a despreading code to despread a received signal and then estimate noise and interference power. The spreading code that is used to spread the pilot symbol and the despreading code that is used in despreading are assigned so as to be orthogonal even if only in N chips on the time axis.

6 Claims, 3 Drawing Sheets

U.S. PATENT DOCUMENTS

2004/0042386 A1* 3/2004 Uesugi et al. .............. 370/204
2004/0071078 A1* 4/2004 Sudo ....................... 370/208

FOREIGN PATENT DOCUMENTS

| | | |
|---|---|---|
| JP | 2001-024618 A | 1/2001 |
| JP | 2001-028557 A | 1/2001 |
| JP | 2001-144724 A | 5/2001 |
| JP | 2001-168837 A | 6/2001 |
| JP | 2001-197037 A | 7/2001 |
| JP | 2001-203664 A | 7/2001 |
| JP | 2002-198902 A | 7/2002 |
| JP | 2002-271296 A | 9/2002 |
| JP | 2003-046474 A | 2/2003 |
| JP | 2003-046481 A | 2/2003 |
| JP | 2004-193670 A | 7/2004 |
| KR | 2001-0110459 A | 12/2001 |

OTHER PUBLICATIONS

Lei Xiao et al, "A Flexible MC-2D-CDMA Communication System Under Rayleigh Fading Channel", The Proceedings of PIMRC 1999, pp. 498-502.

Hiroyasu Sano et al, "SB-11 Wireless Access Techniques and Broadband Mobile Communication Systems", IEEE, Nagoya Institute of Technology, Sep. 7, 2000. p. 378.

Hiroyasu Sato et al., "Multicarrier CDMA scheme which performs time and frequency spreading", Proceedings of the 2000 Institute of Electronics, Information and Communication Engineers Society Conference 1, Sep. 7, 2000, p. 378, B-5-90.

* cited by examiner

US 7,826,514 B2

RADIO TRANSMITTER-RECEIVING APPARATUS AND RADIO TRANSMITTING-RECEIVING METHOD FOR ESTIMATING NOISE AND INTERFERENCE POWER IN RADIO TRANSMISSION USING CODE SPREAD

TECHNICAL FIELD

The present invention relates to a radio transmitter-receiver and a radio transmitting-receiving method that estimates noise and interference power in radio transmission that uses code spreading.

BACKGROUND ART

Radio transmission systems of the prior art include radio transmission systems of the CDMA (Code Division Multiple Access)/TDD (Time Division Duplex) method that suppress the transmission power control error to a low level at mobile stations when diversity reception is performed by means of a plurality of antennas at a base station (For example, refer to Patent Document 1).

Alternatively, in OFDM (Orthogonal Frequency Division Multiplexing)—CDMA communication, there are transmitter-receivers that reduce the difference in amplitudes between subcarriers and maintain orthogonality between spreading codes to improve the transmission efficiency in a multi-path environment (for example, refer to Patent Document 2).

As another example, there are also communication terminal devices of the OFDM-CDMA method that compensate for residual phase errors (for example, refer to Patent Document 3).

In addition, communication devices of the OFDM-CDMA method also exist that prevent deterioration of the error rate characteristic of a demodulated signal without impairing transmission efficiency (for example, refer to Patent Document 4).

Multicarrier transmission devices of the multicarrier CDMA method also exist that neither require a broad frequency band nor cause high peaks in the signal waveform (for example, refer to Patent Document 5).

Still further, there are also OFDM communication devices that arrange information signals that have undergone direct sequence spreading in DS subcarriers to improve the transmission efficiency while suppressing the error rate characteristic of information signals (for example, refer to Patent Document 6).

Cellular spread-spectrum communication systems also exist in which each terminal device can communicate with a base station at a high S/N and that can increase the number of simultaneous communications in each cell (for example, refer to Patent Document 7).

OFDM-CDMA radio communication devices also exist that can prevent both increase in peak power and deterioration of communication quality (for example, refer to Patent Document 8).

In one method of estimating noise and interference power in a radio transmission device that employs CDMA, noise and interference power are estimated by despreading the received signal by means of a spreading code that is not used in spreading the pilot signal. This explanation takes a case in which spreading codes that are spread on the time axis at spreading rate 4 as shown in FIG. 1. The four codes:

Code 1: (1, 1, 1, 1)
Code 2: (1, 1, −1, −1)
Code 3: (1, −1, 1, −1)
Code 4: (1, −1, −1, 1)

are taken as spreading codes. The three codes Code 1, Code 2, and Code 3 are used in the spreading of the pilot signal. If the channel impulse response of the chip spacing is $h_1$, $h_2$, $h_3$, and $h_4$; and the noise and interference components that correspond in time to these values are $NI_1$, $NI_2$, $NI_3$, and $NI_4$, the received signal r is expressed by the following formula:

$$r=(h_1+h_2+h_3+h_4)+(h_1+h_2-h_3-h_4)+(h_1-h_2+h_3-h_4)+\\NI_1+NI_2+NI_3+NI_4=(3h_1+h_2+h_3-h_4)+NI_1+NI_2+\\NI_3+NI_4$$

Despreading signal d, in which this value is spread by Code 4 that was not used in the spreading of the pilot signal, is:

$$d=(3h_1-h_2-h_3-h_4)+NI_1-NI_2-NI_3+NI_4$$

In this case, if:

$$h_1 \approx h_2 \approx h_3 \approx h_4 \qquad \text{[Formula 1]}$$

is true, then:

$$d \approx NI_1-NI_2-NI_3+NI_4 \qquad \text{[Formula 2]}$$

and, since only the noise and interference components remain, the noise and interference power can be estimated by finding the average value of the square of this value. However, when channel fluctuation on the time axis is great, $$h_1 \approx h_2 \approx h_3 \approx h_4 \qquad \text{[Formula 3]}$$

is not realized, and the accuracy of the estimation is thus degraded.

In CDMA, spreading is implemented only on the time axis, but radio transmission methods in which two-dimensional code spreading is carried out on the time axis and frequency axis include MC-2D-CDMA (for example, refer to Non-patent Document 1). In MC-2D-CDMA, two-dimensional code spreading is sometimes used for the pilot signal. It is here assumed that a pilot signal is used that is spread two chips on the time axis and two chips on the frequency axis at a spreading rate 4 as shown in FIG. 2. As with the example of CDMA, a case is here considered in which the three codes Code 1, Code 2, and Code 3 are used to spread the pilot signal, and noise and interference power are estimated by despreading the received signal by Code 4. The channel impulse response values that correspond to $C_0$, $C_1$, $C_2$, and $C_3$ of FIG. 2 are $h_{11}$, $h_{21}$, $h_{12}$, and $h_{22}$, respectively; and the noise and interference components are $NI_{11}$, $NI_{21}$, $NI_{12}$, and $NI_{22}$. As a result of the convolution operation of received signal r and code 4 at this time, despreading signal d is:

$$d = (3h_{11} + NI_{11}) \times 1 + (h_{21} + NI_{21}) \times (-1) +\\(h_{12} + NI_{12}) \times (-1) + (-h_{22} + NI_{22}) \times 1\\= (3h_{11} - h_{21} - h_{12} - h_{22}) + NI_{11} - NI_{21} - NI_{12} + NI_{22}$$

Here, if:

$$h_{11} \approx h_{21} \approx h_{12} \approx h_{22} \qquad \text{[Formula 4]}$$

then:

$$d \approx NI_{11}-NI_{21}-NI_{12}+NI_{22} \qquad \text{[Formula 5]}$$

and, because only the noise and interference components remain, the noise and interference power can be estimated by finding the average value of the square of this value.

Patent Document 1:
　　Japanese Patent Laid-Open Publication No. 2000-91986
Patent Document 2:

Japanese Patent Laid-Open Publication No. 2001-24618
Patent Document 3:
Japanese Patent Laid-Open Publication No. 2001-28557
Patent Document 4:
Japanese Patent Laid-Open Publication No. 2001-144724
Patent Document 5:
Japanese Patent Laid-Open Publication No. 2001-168837
Patent Document 6:
Japanese Patent Laid-Open Publication No. 2001-203664
Patent Document 7:
Japanese Patent Laid-Open Publication No. 2002-198902
Patent Document 8:
Japanese Patent Laid-Open Publication No. 2002-271296
Non-Patent Document 1:
The Proceedings of PIMRC 1999, pp. 498-502.

However, the problem occurs that, when the noise and interference power estimation method that is conventionally used in the above-described CDMA is applied without alteration to a pilot signal that is subjected to two-dimensional spreading as described above, the estimation accuracy deteriorates dramatically if the channel fluctuation on both the frequency axis and the time axis is not sufficiently low. For example, even when fluctuation on the time axis is almost absent, i.e., even when:

$$h_{11} \approx h_{12} \text{ and } h_{21} \approx h_{22} \quad \text{[Formula 6]}$$

then d is:

$$d \approx 2h_{11} - 2h_{21} + NI_{11} - NI_{21} - NI_{12} + NI_{22} \quad \text{[Formula 7]}$$

and if the fluctuation on the frequency axis is great, i.e. if:

$$h_{11} \approx h_{21} \quad \text{[Formula 8]}$$

is not realized, then a signal component remains and the estimation accuracy deteriorates. Even if there is no fluctuation on the frequency axis, i.e., even if:

$$h_{11} \approx h_{21} \text{ and } h_{12} \approx h_{22} \quad \text{[Formula 9]}$$

d is:

$$d \approx 2h_{11} - 2h_{12} + NI_{11} - NI_{21} - NI_{12} + NI_{22} \quad \text{[Formula 10]}$$

and if the fluctuation on the time axis is great, i.e., if:

$$h_{11} \approx h_{12} \quad \text{[Formula 11]}$$

is not realized, then a signal component remains and the estimation accuracy deteriorates.

DISCLOSURE OF THE INVENTION

In view of the above-described problems of the prior art, it is an object of the present invention to provide a radio transmitter-receiver that can realize highly accurate noise and interference power estimation even when either of channel fluctuation on the frequency axis and channel fluctuation on the time axis is great.

To solve the above-described problems in the first radio transmitter-receiver that is provided by the present invention, in a case in which a pilot symbol that has undergone M-chip spreading on the frequency axis and N-chip spreading on the time axis by means of a spreading code having an M×N chip length (where M and N are any integers that are greater than or equal to 2) is used in the transmitter, and in the receiver, a spreading code that is not used in spreading the pilot signal is used as a despreading code to despread the received signal and then estimate the noise and interference power, the spreading code that is used in spreading the pilot symbol and the despreading code that is used in despreading are assigned so as to be orthogonal even if only in N chips on the time axis.

In the second radio transmitter-receiver provided by the present invention, in a case in which a pilot symbol that has undergone M-chip spreading on the frequency axis and N-chip spreading on the time axis by means of a spreading code having an M×N chip length (where M and N are any integers that are greater than or equal to 2) is used in the transmitter, and in the receiver, a spreading code that is not used in spreading the pilot signal is used as a despreading code to despread the received signal and then estimate the noise and interference power, the spreading code that is used in spreading the pilot symbol and the despreading code that is used in despreading are assigned so as to be orthogonal even if only in M chips on the frequency axis.

In the third radio transmitter-receiver provided by the present invention, in a case in which a pilot symbol that has undergone M-chip spreading on the frequency axis and N-chip spreading on the time axis by means of a spreading code having an M×N chip length (where M and N are any integers that are greater than or equal to 2) is used in the transmitter, and in the receiver, a spreading code that is not used in spreading the pilot signal is used as a despreading code to despread the received signal and then estimate the noise and interference power, the spreading code that is used in spreading the pilot symbol and the despreading code that is used in despreading are assigned either to be orthogonal even if only in M chips on the frequency axis or to be orthogonal even if only in N chips on the time axis.

In the fourth radio transmitter-receiver provided by the present invention, in a case in which a pilot symbol that has undergone M-chip spreading on the frequency axis and N-chip spreading on the time axis by means of a spreading code having an M×N chip length (where M and N are any integers that are greater than or equal to 2) is used in the transmitter, and in the receiver, a spreading code that is not used in spreading the pilot signal is used as a despreading code to despread the received signal and then estimate the noise and interference power, code that is orthogonal to the despreading code that is used in despreading even if only in N chips on the time axis is preferentially assigned as a spreading code that is used in spreading pilot symbols.

In the fifth radio transmitter-receiver provided by the present invention, in a case in which a pilot symbol that has undergone M-chip spreading on the frequency axis and N-chip spreading on the time axis by means of a spreading code having an M×N chip length (where M and N are any integers that are greater than or equal to 2) is used in the transmitter, and in the receiver, a spreading code that is not used in spreading the pilot signal is used as a despreading code to despread the received signal and then estimate the noise and interference power, code that is orthogonal to the despreading code that is used in despreading even if only in M chips on the frequency axis is preferentially assigned as the spreading code that is used in spreading pilot symbols.

In the sixth radio transmitter-receiver provided by the present invention, in a case in which a pilot symbol that has undergone M-chip spreading on the frequency axis and N-chip spreading on the time axis by means of a spreading code having an M×N chip length (where M and N are any integers that are greater than or equal to 2) is used in the transmitter, and in the receiver, a spreading code that is not used in spreading the pilot signal is used as a despreading code to despread the received signal and the noise and interference power then estimated, code that is orthogonal to the despreading code that is used in despreading even if only in M chips on the frequency axis, and further, orthogonal even if only in N chips on the time axis is preferentially assigned as spreading code that is used in spreading pilot symbols.

The seventh radio transmitter-receiver provided by the present invention, in a case in which a pilot symbol that has undergone M-chip spreading on the frequency axis and N-chip spreading on the time axis by means of a spreading code having an M×N chip length (where M and N are any integers that are greater than or equal to 2) is used in the transmitter, and in the receiver, a spreading code that is not used in spreading the pilot signal is used as a despreading code to despread the received signal and then estimate the noise and interference power, includes in the receiver: means for detecting whether either of channel fluctuation on the frequency axis and channel fluctuation on the time axis is prominent, and means for reporting the detection results to a transmitter; and when channel fluctuation on the time axis is prominent, assigns as spreading code that is used in spreading a pilot symbol code that is orthogonal to the despreading code that is used in despreading even if only in M chips on the frequency axis; and assigns as spreading code that is used in spreading a pilot symbol code that is orthogonal to despreading code that is used in despreading even if only in N chips on the time axis when channel fluctuation on the frequency axis is prominent.

The eighth radio transmitter-receiver provided by the present invention, in a case in which a pilot symbol that has undergone M-chip spreading on the frequency axis and N-chip spreading on the time axis by means of a spreading code having an M×N chip length (where M and N are any integers that are greater than or equal to 2) is used in the transmitter, and in the receiver, a spreading code that is not used in spreading the pilot signal is used as a despreading code to despread the received signal and then estimate noise and interference power, includes in the transmitter: means for detecting whether either of channel fluctuation on the frequency axis and channel fluctuation on the time axis is prominent; and assigns, as the spreading code that is used in spreading a pilot symbol, code that is orthogonal to the despreading code that is used in despreading even if only in M chips on the frequency axis when channel fluctuation on the time axis is prominent; and assigns, as spreading code that is used in spreading a pilot symbol, code that is orthogonal to the despreading code that is used in despreading even if only in N chips on the time axis when channel fluctuation on the frequency axis is prominent.

The ninth radio transmitter-receiver provided by the present invention, in a case in which a pilot symbol that has undergone M-chip spreading on the frequency axis and N-chip spreading on the time axis by means of a spreading code having an M×N chip length (where M and N are any integers that are greater than or equal to 2) is used in the transmitter, and in the receiver, a spreading code that is not used in spreading the pilot signal is used as a despreading code to despread the received signal and then estimate noise and interference power, includes in the receiver: means for detecting whether either of channel fluctuation on the frequency axis and channel fluctuation on the time axis is prominent and means for reporting the detection results to the transmitter; and when channel fluctuation on the time axis is prominent, preferentially assigns, as spreading code that is used in spreading the pilot symbol, code that is orthogonal to the despreading code that is used in despreading even if only in M chips on the frequency axis; and when channel fluctuation on the frequency axis is prominent, preferentially assigns, as the spreading code that is used in spreading the pilot symbol, code that is orthogonal to the despreading code that is used in despreading even if only in N chips on the time axis.

The tenth radio transmitter-receiver provided by the present invention, in a case in which a pilot symbol that has undergone M-chip spreading on the frequency axis and N-chip spreading on the time axis by means of a spreading code having an M×N chip length (where M and N are any integers that are greater than or equal to 2) is used in the transmitter, and in the receiver, a spreading code that is not used in spreading the pilot signal is used as a despreading code to despread the received signal and then estimate the noise and interference power, includes in the transmitter: means for detecting whether either of channel fluctuation on the frequency axis and channel fluctuation on the time axis is prominent; and when channel fluctuation on the time axis is prominent, preferentially assigns, as spreading code that is used in spreading the pilot symbol, code that is orthogonal to the despreading code that is used in despreading even if only in M chips on the frequency axis; and when channel fluctuation on the frequency axis is prominent, preferentially assigns, as the spreading code that is used in spreading pilot symbols, code that is orthogonal to the despreading code that is used in despreading even if only in N chips on the time axis.

In addition, a delay spread may be used as an index of the channel fluctuation on the frequency axis.

Alternatively, a coherent band may be used as an index of the channel fluctuation on the frequency axis.

Still further, a Doppler frequency may be used as an index of channel fluctuation on the time axis.

The radio transmitter-receiver of the present invention is thus capable of realizing highly accurate noise and interference power estimation even when either the channel fluctuation on the frequency axis or channel fluctuation on the time axis is great.

In addition, when a pilot signal that has undergone two-dimensional spreading is used to estimate noise and interference power, preferential assignment of a pilot signal can realize still greater accuracy in noise and interference power estimation.

BEST MODE FOR CARRYING OUT THE INVENTION

Explanation next regards the embodiments of the present invention.

Figure 3:
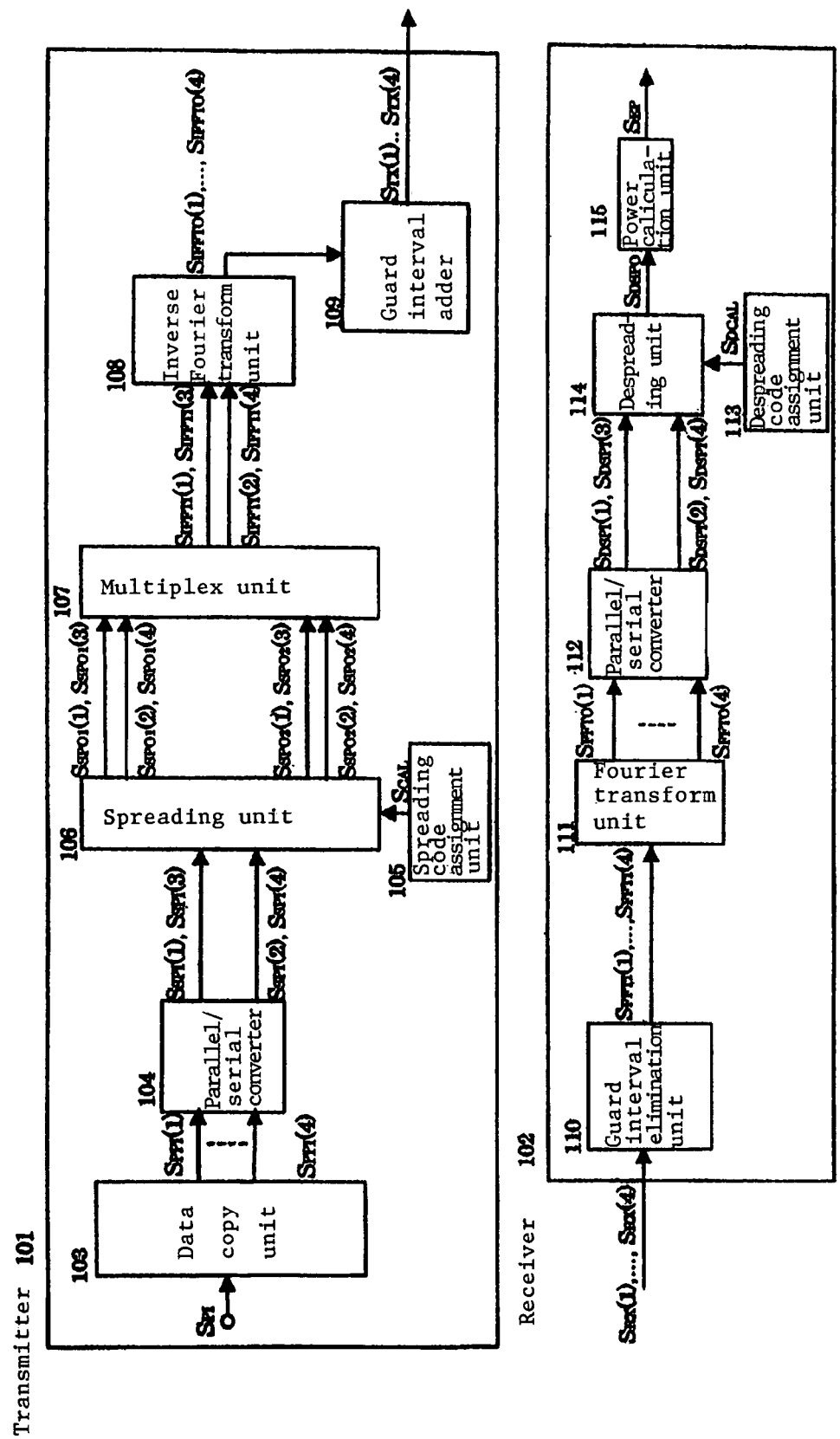
FIG. 3 shows the configuration of the radio transmitter-receiver in the first, second, and third embodiments according to the present invention.

FIG. 3 is a block diagram showing the configuration of a radio transmitter-receiver in the first embodiment according to the present invention. In an actual radio transmitter-receiver, a pilot signal is of course multiplexed with data and transmitted in the transmitter and a means for demodulating the data is necessary in the receiver, but for the sake of simplification, explanation here will focus on only the transmission and reception of the pilot signal. In addition, an example will be described in which a pilot signal is used that is spread at spreading rate 4 on two chips on the frequency axis and two chips on the time axis. In transmitter 101, data copy unit 103 makes four copies of pilot signal $S_{PI}$ and supplies this output as parallel pilot signals $S_{PPI}(1)$-$S_{PPI}(4)$. Parallel/serial converter 104 effects parallel/serial conversion of parallel pilot signals $S_{PPI}(1)$-$S_{PPI}(4)$ and supplies direct spread input signals $S_{SPI}(1)$, $S_{SPI}(2)$, $S_{SPI}(3)$, and $S_{SPI}(4)$ as output. Spreading code assignment unit 105 supplies spreading code assignment signal $S_{CAL}$ as output. Spreading unit 106 receives as input direct spread input signals $S_{SPI}(1)$, $S_{SPI}(2)$, $S_{SPI}(3)$, and $S_{SPI}(4)$ and spreading code assignment signal $S_{CAL}$, and supplies as output first direct spreading output signals $S_{SPO1}(1)$, $S_{SPO1}(2)$, $S_{SPO1}(3)$, and $S_{SPO1}(4)$ and second direct spreading output signals $S_{SPO2}(1)$, $S_{SPO2}(2)$, $S_{SPO2}(3)$, and $S_{SPO2}(4)$. Multiplex unit 107 performs code multiplexing of first direct spreading output signals $S_{SPO1}(1)$, $S_{SPO1}(2)$, $S_{SPO1}(3)$, and $S_{SPO1}(4)$ and second direct spreading output signals $S_{SPO2}(1)$, $S_{SPO2}(2)$, $S_{SPO2}(3)$, and $S_{SPO2}(4)$, and supplies output as IFFT input signals $S_{IFFTI}(1)$, $S_{IFFTI}(2)$, $S_{IFFTI}(3)$, and $S_{IFFTI}(4)$. Inverse Fourier transform unit 108 performs inverse Fourier transformation of IFFT input signals $S_{IFFTI}(1)$, $S_{IFFTI}(2)$, $S_{IFFTI}(3)$, and $S_{IFFTI}(4)$, and supplies output as IFFT output signals $S_{IFFTO}(1)$, $S_{IFFTO}(2)$, $S_{IFFTO}(3)$, and $S_{IFFTO}(4)$. Guard interval adder 109 adds a guard interval to IFFT output signals $S_{IFFTO}(1)$, $S_{IFFTO}(2)$, $S_{IFFTO}(3)$, and $S_{IFFTO}(4)$, and supplies output as transmission signals $S_{TX}(1)$, $S_{TX}(2)$, $S_{TX}(3)$, and $S_{TX}(4)$.

At receiver 102, guard interval elimination unit 110 removes the guard interval from received signals $S_{RX}(1)$, $S_{RX}(2)$, $S_{RX}(3)$, and $S_{RX}(4)$, and supplies as output FFT input signals $S_{FFTI}(1)$, $S_{FFTI}(2)$, $S_{FFTI}(3)$, and $S_{FFTI}(4)$. Fourier transform unit 111 performs Fourier transformation of FFT input signals $S_{FFTI}(1)$, $S_{FFTI}(2)$, $S_{FFTI}(3)$, and $S_{FFTI}(4)$ and supplies as output FFT output signals $S_{FFTO}(1)$, $S_{FFTO}(2)$, $S_{FFTO}(3)$, and $S_{FFTO}(4)$. Parallel/serial conversion unit 112 performs parallel/serial conversion of FFT output signals $S_{FFTO}(1)$, $S_{FFTO}(2)$, $S_{FFTO}(3)$, and $S_{FFTO}(4)$ and supplies as output despreading input signals $S_{DSPI}(1)$, $S_{DSPI}(2)$, $S_{DSPI}(3)$, and $S_{DSPI}(4)$. Despreading code assignment unit 113 supplies despreading code assignment signal $S_{DCAL}$ as output. Despreading unit 114 receives as input despreading input signals $S_{DSPI}(1)$, $S_{DSPI}(2)$, $S_{DSPI}(3)$, and $S_{DSPI}(4)$ and despreading code assignment signal $S_{DCAL}$ and supplies as output despreading output signal $S_{DSPO}$. Power calculation unit 115 receives despreading output signal $S_{DSPO}$ as input, estimates the noise and interference power, and supplies an estimated power signal as output.

The estimation of noise and interference power is realized by the above-described operations.

Figure 1:
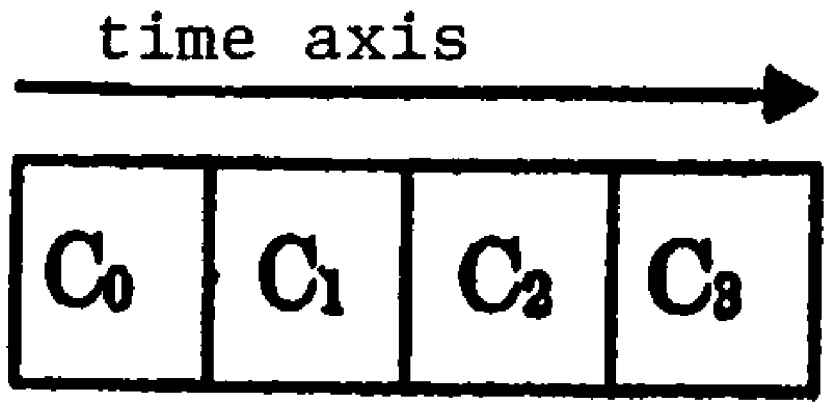
FIG. 1 is a view for explaining spreading code in CDMA.
Figure 2:
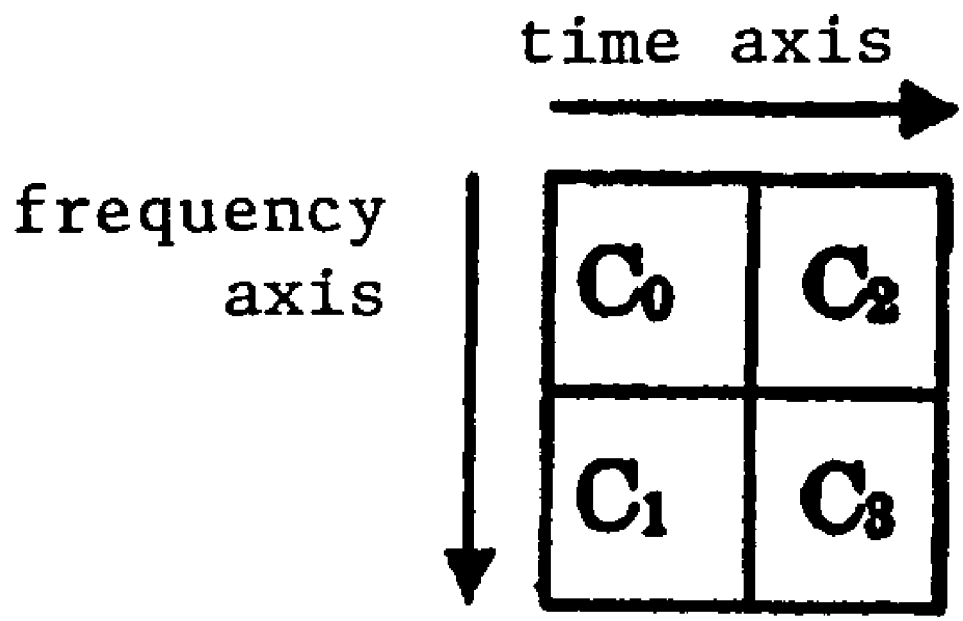
FIG. 2 is a view for explaining the spreading code in two-dimensional spreading.

As a distinguishing feature of the first embodiment, the two spreading codes that are assigned by spreading code assignment unit 105 are orthogonal to the despreading code that is assigned by despreading code assignment unit 113 even if only on the time axis. A pilot signal that is spread two chips on the frequency axis and two chips on the time axis at the spread rate 4 as shown in FIG. 2 is now employed. The four codes:

Code 1: (1, 1, 1, 1)
Code 2: (1, 1, −1, −1)
Code 3: (1, −1, 1, −1)
Code 4: (1, −1, −1, 1)

are used as the spreading codes. At this time, Code 1 and Code 3 are orthogonal to Code 2 and Code 4, even if only on the time axis. Here, it is assumed that spreading code assignment unit 105 assigns Code 1 and Code 3 as spreading codes and despreading code assignment unit 113 assigns Code 2 as the despreading code. The channel impulse response values that correspond to $C_0$, $C_1$, $C_2$, and $C_3$ in FIG. 2 are assumed to be $h_{11}$, $h_{21}$, $h_{12}$, and $h_{22}$, respectively, and the noise and interference components are $NI_{11}$, $NI_{21}$, $NI_{12}$, and $NI_{22}$. At this time, by means of the convolution operation of despreading input signals $S_{DSPI}(1)$, $S_{DSPI}(2)$, $S_{DSPI}(3)$, and $S_{DSPI}(4)$ and Code 3, despreading output signal $S_{DSPO}$ is:

$$S_{DSPO} = (2h_{11} + NI_{11}) \times 1 + (0 + NI_{21}) \times 1 +$$
$$(2h_{12} + NI_{12}) \times (-1) + (0 + NI_{22}) \times (-1)$$
$$= (2h_{11} - 2h_{12}) + NI_{11} + NI_{21} - NI_{12} - NI_{22}$$

Accordingly, if the channel fluctuation on the time axis is small, i.e., if:

$$h_{11} \approx h_{12} \text{ and } h_{21} \approx h_{22} \quad \text{[Formula 12]}$$

then the signal components cancel each other out. Similarly, when spreading code assignment unit 105 assigns only Code 1 as the spreading code, then:

$$S_{DSPO} = (h_{11} + NI_{11}) \times 1 + (h_{21} + NI_{21}) \times 1 +$$
$$(h_{12} + NI_{12}) \times (-1) + (h_{22} + NI_{22}) \times (-1)$$
$$= (h_{11} - h_{12}) + (h_{21} - h_{22}) + NI_{11} + NI_{22} - NI_{12} - NI_{22}$$

and when spreading code assignment unit 105 assigns only Code 3 as the spreading code, then:

$$S_{DSPO} = (h_{11} + NI_{11}) \times 1 + (-h_{21} + NI_{21}) \times 1 +$$
$$(h_{12} + NI_{12}) \times (-1) + (-h_{22} + NI_{22}) \times (-1)$$
$$= (h_{11} - h_{12}) - (h_{21} - h_{22}) + NI_{11} + NI_{21} - NI_{12} - NI_{22}$$

And as a result, if the channel fluctuation on the time axis is small, i.e., if:

$$h_{11} \approx h_{12} \text{ and } h_{21} \approx h_{22} \quad \text{[Formula 13]}$$

then the signal components cancel each other out.

As described above, assignment such that the spreading code that is used in spreading the pilot symbol and the despreading code that is used in despreading are orthogonal even if only in N chips on the time axis allows realization of highly accurate noise and interference power estimation despite large channel fluctuation on the frequency axis if channel fluctuation on the time axis is small.

Explanation next regards the second embodiment according to the present invention. The configuration of this radio transmitter-receiver being identical to that of the first embodiment, this configuration is shown by the block diagram of FIG. 3. The second embodiment and the first embodiment differ in that the two spreading codes that are assigned by spreading code assignment unit 105 are orthogonal to the despreading code that is assigned by despreading code assignment unit 113 even if only on the frequency axis. It is now assumed that a pilot signal is used that has been spread two chips on the frequency axis and two chips on the time axis by means of a spreading rate 4 as shown in FIG. 2. The four codes:
Code 1: (1, 1, 1, 1)
Code 2: (1, 1, −1, −1)
Code 3: (1, −1, 1, −1)
Code 4: (1, −1, −1, 1)
are taken as the spreading codes. At this time, Code 1 and Code 2 are orthogonal to Code 3 and Code 4 even if only on the frequency axis. Spreading code assignment unit 105 assigns Code 1 and Code 2 as the spreading codes, and despreading code assignment unit 113 assigns Code 3 as the despreading code. The channel impulse response values that correspond to $C_0$, $C_1$, $C_2$, and $C_3$ in FIG. 2 are $h_{11}$, $h_{21}$, $h_{12}$, and $h_{22}$, respectively, and the noise and interference components are $NI_{11}$, $NI_{21}$, $NI_{12}$, and $NI_{22}$. At this time, by means of the convolution operation of despreading input signals $S_{DSPI}(1)$, $S_{DSPI}(2)$, $S_{DSPI}(3)$, and $S_{DSPI}(4)$ and Code 3, the despreading output signal $S_{DSPO}$ is:

$$S_{DSPO} = (2h_{11} + NI_{11}) \times 1 + (2h_{21} + NI_{21}) \times (-1) +$$
$$(0 + NI_{12}) \times 1 + (0 + NI_{22}) \times (-1)$$
$$= (2h_{11} - 2h_{21}) + NI_{11} - NI_{21} + NI_{12} - NI_{22}$$

And as a result, if the channel fluctuation on the frequency axis is small, i.e., if:

$$h_{11} \approx h_{21} \text{ and } h_{12} \approx h_{22} \qquad \text{[Formula 14]}$$

then the signal components cancel each other out. Similarly, when spreading code assignment unit 105 assigns only Code 1 as the spreading code, then:

$$S_{DSPO} = (h_{11} + NI_{11}) \times 1 + (h_{21} + NI_{21}) \times (-1) +$$
$$(h_{12} + NI_{12}) \times 1 + (h_{22} + NI_{22}) \times (-1)$$
$$= (h_{11} - h_{21}) + (h_{12} - h_{22}) + NI_{11} - NI_{21} + NI_{12} - NI_{22}$$

If spreading code assignment unit 105 assigns only Code 2 as the spreading code, then:

$$S_{DSPO} = (h_{11} + NI_{11}) \times 1 + (h_{21} + NI_{21}) \times (-1) +$$
$$(-h_{12} + NI_{12}) \times 1 + (-h_{22} + NI_{22}) \times (-1)$$
$$= (h_{11} - h_{21}) - (h_{12} - h_{22}) + NI_{11} - NI_{21} + NI_{12} - NI_{22}$$

Thus, if the channel fluctuation on the frequency axis is small, i.e., if:

$$h_{11} \approx h_{21} \text{ and } h_{12} \approx h_{22} \qquad \text{[Formula 15]}$$

then the signal components cancel each other out.

As described above, assignment such that the spreading codes that are used in spreading the pilot symbol and the despreading code that is used in despreading are orthogonal even if only in M chips on the frequency axis allows realization of highly accurate noise and interference power estimation even when channel fluctuation is great on the time axis as long as channel fluctuation is small on the frequency axis.

Explanation next regards the third embodiment according to the present invention. The configuration of this radio transmitter-receiver, being the same as that of the first and second embodiments, is shown in the block diagram of FIG. 3. However, the output of spreading unit 106 is only first direct spreading output signals $S_{SPO1}(1)$, $S_{SPO1}(2)$, $S_{SPO1}(3)$ and $S_{SPO1}(4)$ In addition, the third embodiment differs from the first and second embodiments in that the spreading code that is assigned by spreading code assignment unit 105 is orthogonal to the despreading code that is assigned by despreading code assignment unit 113 even if only on the frequency axis and only the time axis. It is now assumed that a pilot signal is used that has been spread two chips on the frequency axis and two chips on the time axis at a spreading rate 4 as shown in FIG. 2. The four codes:
Code 1: (1, 1, 1, 1)
Code 2: (1, 1, −1, −1)
Code 3: (1, −1, 1, −1)
Code 4: (1, −1, −1, 1)
are taken as the spreading codes. At this time, Code 1 is orthogonal to Code 4 even if only on the frequency axis and only on the time axis. This relation also holds between Code 3 and Code 4. Spreading code assignment unit 105 assigns Code 1 as the spreading code, and despreading code assignment unit 113 assigns Code 4 as the despreading code. The channel impulse response values that correspond to $C_0$, $C_1$, $C_2$, and $C_3$ in FIG. 2 are $h_{11}$, $h_{21}$, $h_{12}$, and $h_{22}$, respectively, and the noise and interference components are $NI_{11}$, $NI_{21}$, $NI_{12}$, and $NI_{22}$. At this time, the convolution operation of despreading input signals $S_{DSPI}(1)$, $S_{DSPI}(2)$, $S_{DSPI}(3)$, and $S_{DSPI}(4)$ and Code 4, the despreading output signal $S_{DSPO}$ yields:

$$S_{DSPO} = (h_{11} + NI_{11}) \times 1 + (h_{21} + NI_{21}) \times (-1) +$$
$$(h_{12} + NI_{12}) \times (-1) + (h_{22} + NI_{22}) \times 1$$
$$= (h_{11} - h_{21} - h_{12} + h_{22}) + NI_{11} - NI_{21} - NI_{12} + NI_{22}$$

And as a result, if the channel fluctuation is small on either of the frequency axis and the time axis, i.e., if either of:

$$h_{11} \approx h_{21} \text{ and } h_{12} \approx h_{22} \text{ and } h_{11} \approx h_{12} \text{ and } h_{21} \approx h_{22} \qquad \text{[Formula 16]}$$

is true, then the signal components cancel each other out.

As described above, assignment such that the spreading codes that are used in spreading the pilot symbol and the despreading code that is used in despreading are orthogonal even if only in M chips on the frequency axis or only in N chips on the time axis allows realization of highly accurate noise and interference power estimation if either of channel fluctuation on the frequency axis and channel fluctuation on the time axis is small.

Figure 4:
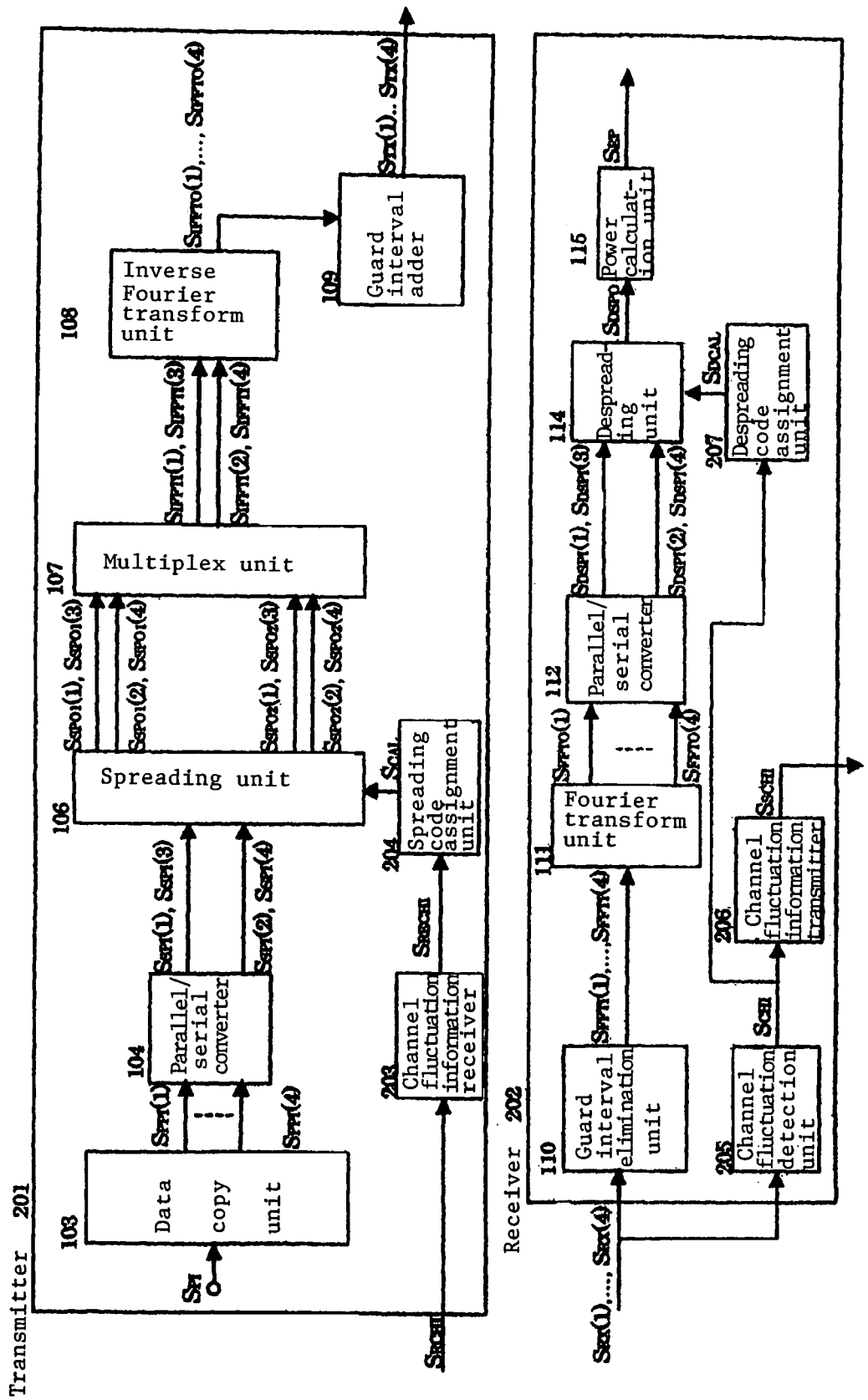
FIG. 4 shows the configuration of the radio transmitter-receiver in the fourth embodiment according to the present invention.

FIG. 4 is a block diagram showing the configuration of a radio transmitter-receiver in the fourth embodiment of the present invention. As the points of difference between this figure and FIG. 3, which is the block diagram in the first to third embodiments:

In transmitter 201, channel fluctuation information receiver 203 is included for receiving channel fluctuation information signal $S_{RCHI}$ as input, reproducing channel fluctuation information, and supplying this information as reproduction channel fluctuation information $S_{RECHI}$; and spreading code assignment unit 204 determines the assignment of spreading codes based on reproduction channel fluctuation information $S_{RECHI}$.

In receiver 202, channel fluctuation detection unit 205 is included for receiving received signals $S_{RX}(1)$, $S_{RX}(2)$, $S_{RX}(3)$, and $S_{RX}(4)$ as input, detecting channel fluctuation, and supplying the detection result as channel fluctuation information $S_{CHI}$; channel fluctuation information transmitter 206 is included for receiving channel fluctuation information $S_{CHI}$ as input and supplying transmission channel fluctuation information $S_{SCHI}$ as output; and despreading code assignment unit 207 determines the assignment of the despreading code based on channel fluctuation information $S_{CHI}$.

Assignment is realized in despreading code assignment unit 207 based on channel fluctuation information $S_{CHI}$ and in spreading code assignment unit 204 based on reproduction channel fluctuation information $S_{RECHI}$ that has reproduced channel fluctuation information $S_{CHI}$ such that the spreading code and despreading code are orthogonal even if only in M chips on the frequency axis when channel fluctuation on the time axis is greater than fluctuation on the frequency axis and such that the spreading code and despreading code are orthogonal even if only in N chips on the time axis when channel fluctuation on the frequency axis is greater than fluctuation on the time axis.

By means of the above-described operations, code assignment can be realized in accordance with channel fluctuation to enable greater accuracy in noise and interference power estimation.

In addition, when noise and interference power is estimated by using a pilot signal that has been subjected to two-dimensional spreading, preferential assignment of the pilot signal enables greater accuracy in noise and interference power estimation.

The invention claimed is:

1. A radio transmitter-receiver wherein a pilot symbol that has undergone M-chip spreading on a frequency axis and N-chip spreading on a time axis by means of a spreading code having an M×N chip length (where M and N are any integers greater than or equal to 2) is used in the transmitter, and in the receiver, a spreading code that is not used in spreading a pilot signal is used as a despreading code to despread a received signal and then estimate noise and interference power;

wherein said spreading code that is used in spreading a pilot symbol and said despreading code that is used in despreading are assigned so as to be orthogonal at least in only N chips on the time axis and/or in only M chips on the frequency axis, and wherein at least one of code that is orthogonal to said despreading code that is used in despreading even if only in M chips on the frequency axis and/or code that is orthogonal to said despreading code that is used in despreading even if only in N chips on the time axis is preferentially assigned as said spreading code that is used in spreading pilot symbols, wherein the transmitter-receiver further comprises means for detecting whether either of channel is fluctuated on the frequency axis or channel is fluctuated on the time axis, wherein:

code that is orthogonal even if only in M chips on the frequency axis is assigned as said spreading code that is used in spreading a pilot symbol when channel is fluctuated on the time axis; and code that is orthogonal even if only in N chips on the time axis is assigned as said spreading code that is used in spreading a pilot symbol when channel is fluctuated on the frequency axis.

2. A radio transmitter-receiver according to claim 1, wherein delay spread is used as an index of channel fluctuation on the frequency axis.

3. A radio transmitter-receiver according to claim 1, wherein a coherent band is used as an index of channel fluctuation on the frequency axis.

4. A radio transmitter-receiver according to claim 1, wherein Doppler frequency is used as an index of channel fluctuation on the time axis.

5. A radio transmitting and receiving method wherein a pilot symbol that has undergone M-chip spreading on a frequency axis and N-chip spreading on a time axis by means of a spreading code having an M×N chip length (where M and N are any integers greater than or equal to 2) is used in the transmitter, and in the receiver, a spreading code that is not used in spreading a pilot signal is used as a despreading code to despread a received signal and then estimate noise and interference power;

wherein said spreading code that is used in spreading a pilot symbol and said despreading code that is used in despreading are assigned so as to be orthogonal at least in only N chips on the time axis and/or in only M chips on the frequency axis, and wherein at least one of code that is orthogonal to said despreading code that is used in despreading even if only in M chips on the frequency axis and/or code that is orthogonal to said despreading code that is used in despreading even if only in N chips on the time axis is preferentially assigned as said spreading code that is used in spreading pilot symbols, wherein:

code that is orthogonal even if only in M chips on the frequency axis is assigned as said spreading code that is used in spreading a pilot symbol when channel is fluctuated on the time axis; and code that is orthogonal even if only in N chips on the time axis is assigned as said spreading code that is used in spreading a pilot symbol when channel is fluctuated on the frequency axis.

6. A radio transmitter-receiver according to claim 1, wherein the spreading code is at least one of a plurality of orthogonal spreading codes.

* * * * *